UNITED STATES PATENT OFFICE.

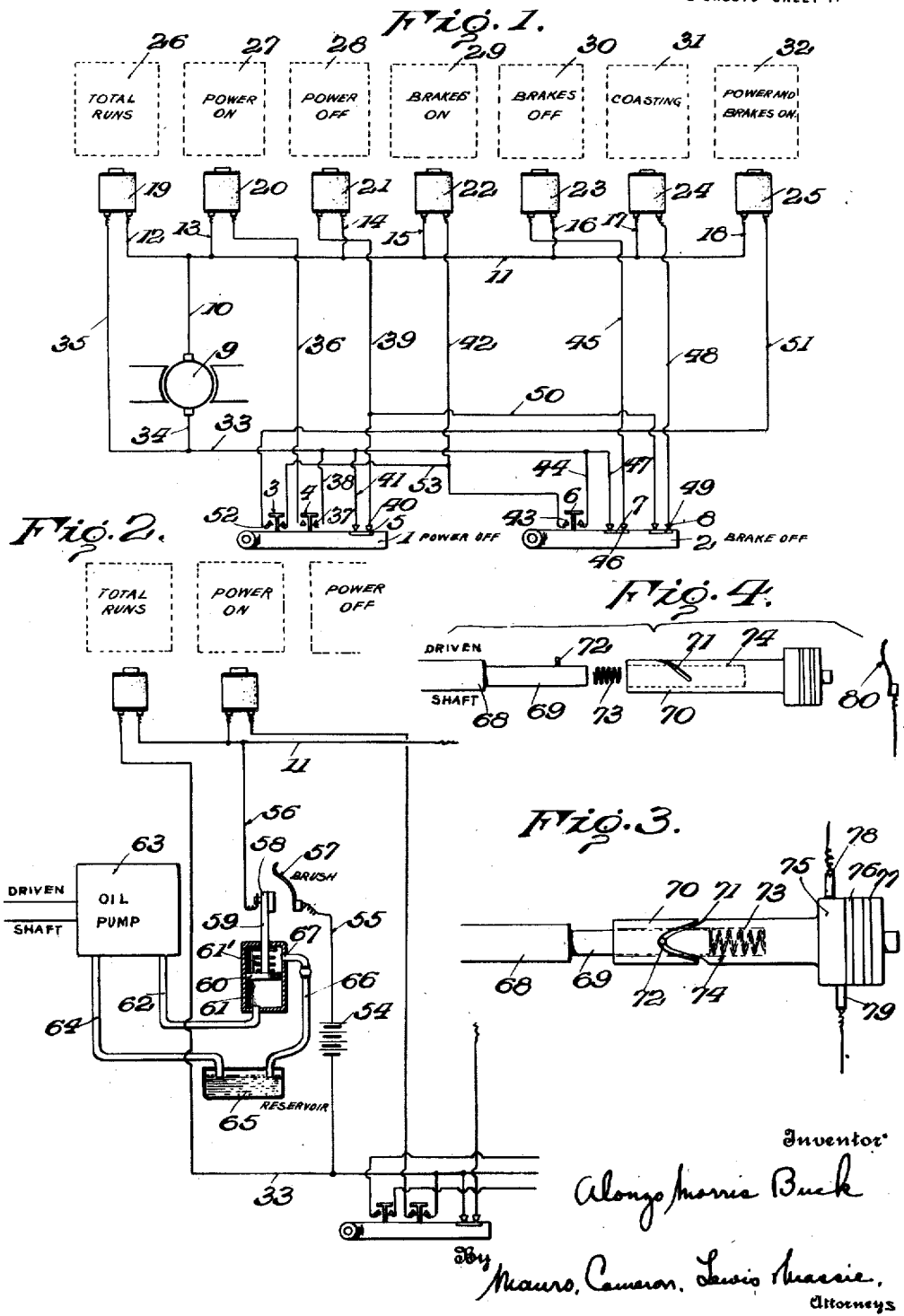

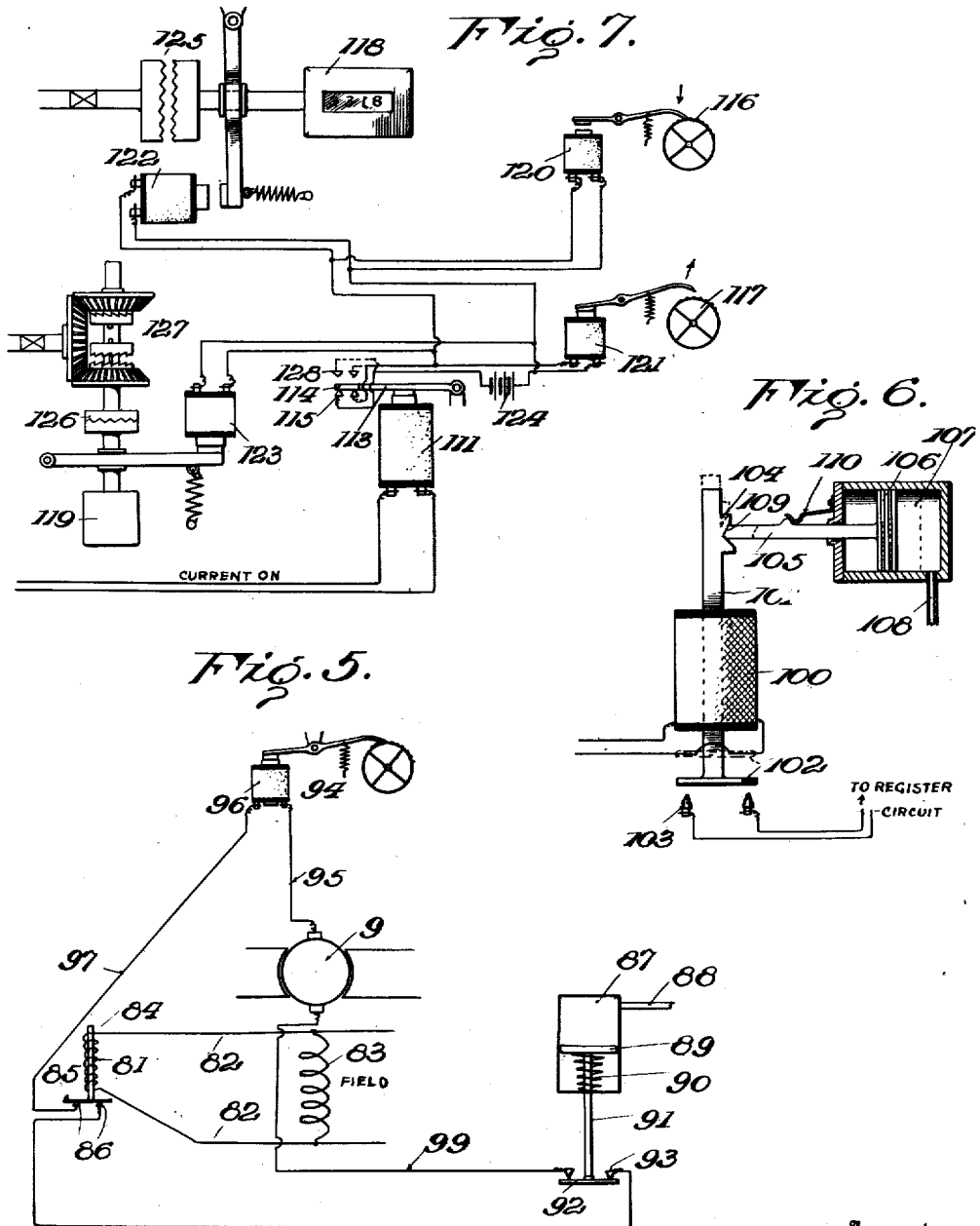

ALONZO MORRIS BUCK, OF ELIZABETH, NEW JERSEY.

REGISTERING MECHANISM FOR VEHICLES OR TRACTORS.

1,340,324.  Specification of Letters Patent.  Patented May 18, 1920.

Application filed May 8, 1918. Serial No. 233,353.

*To all whom it may concern:*

Be it known that I, ALONZO MORRIS BUCK, a citizen of the United States of America, and a resident of Elizabeth, New Jersey, have invented a new and useful Improvement in Registering Mechanism for Vehicles or Tractors, which invention is fully set forth in the following specification.

This invention relates to apparatus for registering the characteristics of a run of a vehicle or tractor.

In analyzing the operation or control of a vehicle or tractor to ascertain the characteristics of its run, the efficiency of an operator, or for other purposes, some or all of the periods during which power is on, power is off, the brake is on, the brake is off, and the several combinations thereof, must be taken into consideration.

Thus, in analyzing the run of an electric car, it has been suggested, in determining the efficiency of the motorman, to register the periods during which the car is coasting, *i. e.*, moving with power off and the brakes off. To this end, coasting recorders have been devised which depended for their operation upon the sequence of events: power on—power off—brake on—brake off, a record being made of the period between the cutting off of power and the application of the brakes. It has been found, however, that a motorman can readily secure a false record by throwing on the power sufficiently to energize the recorder circuit and then allowing the car to stand or come to a standstill: the recorder will operate until the power is again thrown on. To remedy this defect, it has been suggested to energize the recorder circuit by regenerative voltage from the motor, whereby said circuit will be supplied with current to operate the relay or relays therein only when the motor is running idle and operating as a generator. Some motors, however, do not provide sufficient regenerative voltage to actuate relays, and a system depending upon regenerative voltage must always be adjusted to the characteristics of each particular motor owing to the difference in regenerative voltage produced by different motors, even though made according to the same plans. This latter consideration has made it impossible to move motors from one car to another without a laborious and time-consuming readjustment of the systems in the several cars.

It is an object of this invention to provide an apparatus for registering the characteristics of a run of a vehicle or tractor which cannot be operated so as to produce a false record and which will permit the change of motors from one car to another without readjustment of the systems.

Another object of this invention is to provide an apparatus of the type characterized with means driven by the movement of the vehicle or tractor whereby the circuit or circuits including the registering mechanism will be energized only while the car is in motion.

Yet another object of the invention is to provide a control device comprising coacting elements of simplified construction whereby a single switch may be opened or closed only following a desired sequence of events.

A further object of the invention is to provide apparatus of the type in question which is simple in construction, efficient in operation, easy to install, and inexpensive to manufacture.

Stated broadly, the invention comprises, in an apparatus for registering the characteristics of a run of a vehicle or tractor and in combination with the motor thereof and its power-controlling and brake-controlling systems, an electrical circuit including registering mechanism, switches in said circuit respectively operated by elements in said power-controlling and said brake-controlling systems, and means driven by the movement of said vehicle or tractor whereby said circuit is supplied with current only while said vehicle or tractor is in motion.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

In said drawings, wherein the same characters of reference designate corresponding parts in the several figures,—

Figure 1 is a diagrammatic view of an apparatus embodying the present invention and showing the control elements in "power-off" and "brake-off" position;

Fig. 2 is a diagrammatic view of another embodiment of this invention and illustrates different mechanism driven by the vehicle or tractor for supplying the circuit including the registering mechanism with current only while the vehicle or tractor is in motion;

Fig. 3 is a diagrammatic view of another embodiment illustrating different mechanism driven by the vehicle or tractor for supplying the circuit including the registering mechanism with current only while the vehicle or tractor is in motion;

Fig. 4 shows the elements of the mechanism in Fig. 3 in separated relationship;

Fig. 5 is a diagrammatic view illustrating other mechanism constituting an embodiment of this invention and operated by elements in the power-controlling and brake-controlling systems for closing the circuit including the registering mechanism;

Fig. 6 is a diagrammatic view of a control device for operating a switch only following a desired sequence of events; and Fig. 7 is a diagrammatic view of a registering system that may be employed in connection with this invention.

In Fig. 1 is shown a system or apparatus, embodying the present invention, suitable for application to any motor-driven vehicle or tractor, whether the same be a railway car, a steam or electric locomotive, an automobile, or any other vehicle or tractor, and whether the motor be an electric motor, a steam or internal combustion engine, or any other suitable type of motor. In said apparatus, 1 designates an element in the power-controlling system. This element may be of any suitable construction and operated by any suitable member in said system, and it will vary in accordance with the type of motor and vehicle or tractor employed. Thus, it may be an element moved by the controller of an electric car, a throttle valve in a steam supply system, a valve in a fuel supply system, a pressure element operatively connected to the cylinder of a steam or internal combustion engine, etc., so long as it has different positions determined by whether power is on or power is off. 2 is an element in the brake-controlling system. This element may be of any suitable construction and operated by any suitable member in said system, and it will vary in accordance with the type of brake system and vehicle or tractor employed. Thus, it may be an element moved by an air-controlled valve or member in a pneumatic brake system, an element moved by a switch or controller in an electric brake system, an element moved by mechanical parts in a mechanical brake system, an element moved by a pressure responsive device in a pressure-operated brake system, etc., so long as it has different positions determined by whether the brake is on or the brake is off. In the form shown, element 1 is provided with three circuit-closing elements 3, 4 and 5 respectively, while element 2 is provided with three circuit-closing elements 6, 7 and 8 respectively. These several circuit-closing elements are adapted to open and close circuits through suitable registering mechanism as will be hereinafter explained.

9 represents diagrammatically a generator, whether a magneto or a self or separately excited generator, driven from any suitable shaft of the vehicle or tractor. Generator 9 is connected by a line wire 10 to the common supply wire 11 from which branch wires 12, 13, 14, 15, 16, 17 and 18, lead respectively to relays 19, 20, 21, 22, 23, 24 and 25, operatively related to registering devices or systems 26, 27, 28, 29, 30, 31 and 32 respectively. 33 is a common return wire connected to the generator 9 by wire 34.

In the form shown, registering device or system 26 is designed to register the total period the vehicle or tractor is in motion and therefore the relay 19 is connected directly to return wire 33 through wire 35. Registering device or system 27 is designed to register when the power is on, and therefore relay 20 is connected by wire 36 to one of two contact elements 37, the opposed element of which is connected to return wire 33 by wire 38. Contacts 37 are bridged by circuit element 4 when element 1 is moved to a position corresponding to power on. Registering device or system 28 is designed to register when the power is off, and its relay 21 is therefore connected by wire 39 to one of two contact elements 40, the opposed element of which is connected to return wire 33 by wire 41. Contacts 40 are bridged by circuit-closing element 5 when element 1 is moved to a position corresponding to power off.

Registering device or system 29 is designed to register when the brakes are on, and therefore its relay 22 is connected by wire 42 to one of two contact elements 43, the opposed element of which is connected to return wire 33 by wire 44. Contact elements 43 are bridged by circuit closing element 6 when element 2 is moved to a position corresponding to brakes on. Registering device or system 30 is designed to register when the brakes are off, and therefore its relay 23 is connected by wire 45 to one of two contact elements 46, the opposed element of which is connected to return wire 33 by wire 47. Contact elements 46 are bridged by circuit-closing element 7 when element 2 is moved to a position corresponding to brakes off.

When the coasting period is to be considered, it is desirable to have a registering device or system which takes account solely of the coasting period, and such a device or system is shown at 31. Inasmuch as coasting is a function of power off and brakes off, the relay 24 is connected into the power-off and brake-off circuits above described. To this end, relay 24 is connected by wire 48 to one of two contacts 49, the opposed element of which is connected by wire 50 to wire 39. Contact elements 49 are bridged by circuit-closing element 8 when the element 2 is moved to a position corresponding to brakes off, but the circuit is completed only when circuit-closing element 5 bridges contact element 40 in the position of element 1 corresponding to power off.

It may also be desirable to register separately the periods when the power and brakes are both on. Such a registering device or system is shown at 32 and the relay 25 thereof is connected into the power-on and brake-on circuits above described. To this end, relay 25 is connected by a wire 51 to one of two contact elements 52, the opposed element of which is connected by wire 53 to wire 42. Contact elements 52 are bridged by circuit-closing element 3 when element 1 is moved to a position corresponding to power on, but the circuit is completed only when circuit-closing element 6 bridges contact elements 43 in a position of element 2 corresponding to brakes on. Similarly, separate registering devices or systems may be provided for registering the periods when the power is on and the brakes are off, or when the power is off and the brakes are on, but such have been omitted to avoid unnecessary complexity of the drawings.

It will thus be perceived that an apparatus has been provided comprising an electric circuit including registering mechanism, switches in said circuit respectively operated by elements in the power-controlling and brake-controlling systems, and means driven by the movement of the vehicle or tractor whereby said circuit is supplied with current only while the vehicle or tractor is in motion.

In place of a generator driven by a shaft of the vehicle or tractor, the circuit including the registering mechanism may be supplied with current by the positive operation of a switch which controls the connection thereto of a battery or other source of power, or a shunt line from the motor-supplying circuit when an electric motor is employed, which may be opened and closed upon the starting and stopping of the vehicle respectively, or the switch may be opened and closed periodically by a member driven during the movement of the vehicle. Two structures of the former type are shown in Figs. 2 to 4. Referring to Fig. 2, wherein only two registering devices or systems with their respective relays and but one set of switches are illustrated, a battery 54 is shown interposed between the common supply wire 11 and the common return wire 33. As heretofore stated, any other source of current or, when an electric motor is used, a shunt from the motor-supply circuit may be substituted for said battery 54. Said battery is shown connected to wire 11 by wires 55 and 56 between which is interposed switch elements 57 and 58. Switch element 58, in the form shown, is mounted on the stem 59 of a piston 60 normally urged by a spring 61' to a position wherein element 58 is out of contact with element 57. Piston 60 is designed to reciprocate within a cylinder 61 which communicates by pipe 62 with any suitable fluid-circulating pump 63, such as the oil pump of a lubricating system. Pump 63 is designed to draw fluid through pipe 64 from a reservoir 65 with which communicates a pipe 66 leading from the lateral wall of the cylinder as shown at 67. Pump 63 may be driven by any suitable shaft of the vehicle or tractor. When the latter is started in motion, fluid is pumped from the reservoir 65 into cylinder 61 and the pressure produced in the latter causes the piston 60 to rise therein to a point such that the fluid may return to the reservoir through pipe 66, in which position the contact element 58 is in engagement with contact element 57 and the circuit through the system including the registering mechanism is closed.

Referring to Figs. 3 and 4, a mechanical means for positively closing the circuit including the registering mechanism is illustrated. In these figures, 68 is any suitable shaft driven by the vehicle. In the form shown, said shaft is reduced at its outer end at 69 and receives thereon a sleeve 70 provided with a cam slot 71 with which is designed to coöperate a pin 72 mounted on the reduced end 69 of said shaft 68. Said pin 72 may be provided with a roller if desired. A spring 73 is interposed between the end of shaft 68—69 and the bottom of the socket 74 provided in said sleeve 70, and is of sufficient tension to normally maintain the pin 72 at the high point of the cam provided by the slot 71. Said sleeve carries any suitable circuit-closing device. In the form shown, the sleeve is enlarged at 75 and provided with a pair of contact rings 76 and 77 in electrical connection. Contact brushes 78 and 79 are designed to engage said rings 76 and 77 respectively when pin 72 is moved to the lower part of the cam slot 71. In place of two contact rings, however, a single contact ring could obviously be employed, or, as diagrammatically illustrated in Fig. 4, the end of sleeve 70 might constitute one of the contact elements and a spring contact element 80 be interposed in the path of reciprocation of said sleeve.

In operation, as soon as the shaft 68 begins to rotate, the friction of the brushes, or of some other element or elements especially provided for that purpose, operates as a load on the sleeve 70 and retards its rotation, whereupon pin 72 travels along the cam slot 71 until the sleeve 70 is moved to a positon to bring the brushes 78 and 79 into electrical engagement with the contact rings 76 and 77 respectively, thereby closing the circuit including the registering mechanism.

In place of the elements shown at 1 and 2 for operating the switches and closing the circuit including the registering mechanism, any other suitable means that will assume different positions when the power is on and the power is off and when the brake is on and the brake is off may be employed to operate said switches. Thus, referring to diagrammatic Fig. 5, wherein 9 designates a generator driven by a shaft of the vehicle or tractor, a switch responsive to the conditions of power-on or power-off is shown operated by a shunt in the field of the motor of the vehicle or tractor. In the form shown, a solenoid 81 and wires 82 constitute a shunt about the field circuit 83 of the electric motor of the vehicle or tractor, and the armature 84 of said solenoid is provided with a circuit-closing element 85 designed to bridge contact elements 86. Also, a switch responsive to the conditions of brake-on or brake-off is shown operated by a pressure-responsive element in the brake system. In the form illustrated, a cylinder 87 is in communication by pipe 88 with the brake-controlling system and contains a piston 89 normally urged to its uppermost position by a spring 90. Piston rod 91 carries a circuit-closing element 92 designed to bridge contact elements 93. In this figure, but a single registering mechanism is designated at 94, and the circuit thereof comprises generator 9, wire 95, relay 96, wire 97, switch 86—85, wire 98, switch 93—92, and wire 99. When the power is on, solenoid 81 is energized and circuit-closing element 85 is raised out of contact with contact elements 86, but when the power is off circuit-closing element 85 drops into contact with said contact elements. When the brake is on, the pressure in cylinder 87 holds circuit-closing element 92 out of contact with the contact elements 93, but when the brake is off, spring 90 raises circuit-closing element 92 into engagement with contact elements 93. Therefore, when the power is off and the brake is off, the circuit is completed through the relay 96 and the registering mechanism will register the period of coasting if the circuit be energized by the generator 9 owing to the movement of the vehicle or tractor.

Referring to Fig. 6, a control device is disclosed which, while of general application, has particular utility in connection with the registering of the coasting period as heretofore discussed, said control device employing, however, but a single switch in the circuit including the registering mechanism. In the form shown, a solenoid 100, which when the device is used for registering the coasting period will be in a circuit that is closed only when the power is on, is provided with an armature or core 101 carrying a circuit-closing element 102 designed to bridge contacts 103 in the circuit leading to the registering mechanism. Armature 101 carries, shown as integral therewith, a member 104 provided with a V-shaped groove with which is designed to coact the stem 105 of a second element in a second system. In the form shown, stem 105 is connected to a piston 106 in a cylinder 107 which communicates by a pipe 108 with the brake-controlling system. In place of a piston and cylinder, however, it is apparent that the element 105 could be the armature or core of a second solenoid in, for example, an electric brake-controlling system. End 109 of stem 105 is beveled to the incline of the groove in member 104, and, by coaction with said member, is designed to cam upwardly the armature 101. When solenoid 100 is energized, armature 101 rises to the dotted line position and the lower incline of member 104 cams stem 105 to the right out of the path of the upper portion of member 104, so that, when solenoid 100 is deënergized, said armature may drop and the circuit-closing element 102 bridge the contacts 103. When pressure is supplied to the brake-controlling system, piston 106 is moved to the left and the end 109 of stem 105 engages the upper incline of member 104 and raises armature 101 so as to disconnect circuit-closing element 102 and contact elements 103, in which intermediate position, shown in full lines, it will retain the same either by the friction of the piston 106 in cylinder 107 or by any other suitable means, as a suitable spring detent 110, even though the brakes be taken off. The closing of the switch 102—103, therefore, depends upon the sequence: power on— power off, and the switch will be open whenever the brakes are on. If the brakes are thrown on while the power is on, the armature 101 is in its uppermost position and stem 105 may be prevented from moving to the left by engagement thereof with the lower nose of member 104, or, as in the form shown, the lower incline may be made to project sufficiently to the right so as to never pass out of engagement with end 109 of stem 105.

In the figures heretofore discussed, the registering mechanism has been shown only diagrammatically. In Fig. 7, however, is shown, somewhat more in detail, a suitable type of registering mechanism which may be employed, it being understood that the registering mechanism of Fig. 7 may be used as the registering device of any one or more or all of the registering devices or systems 26—32, Fig. 1. It is to be expressly understood, however, that the invention is not limited to the use of any particular kind of registering mechanism as any suitable device or system of this type may be employed, that selected for illustration and description being chosen as an example only. In said figure, 111 is a relay corresponding with any of the relays 19—25 above described. Relay 111 is shown provided with an armature 113 carrying a circuit-closing element 114 designed to bridge contacts 115. The circuit closed by the engagement of contact elements 114—115 is shown as including a time indicator 116, a time recorder 117, provided with a printing attachment if desired, a distance indicator 118, and a distance recorder 119, provided with a printing attachment if desired. Elements 116, 117, 118, 119 are respectively provided with relays 120, 121, 122, and 123 connected in parallel with the switch 114—115 and any suitable source of current as a battery 124. Distance indicator 118 is shown as provided with a clutch 125 which is operated when relay 122 is energized and which drives the indicator only when the vehicle or tractor is moving in one direction. Distance recorder 119 is shown as provided with a clutch 126 which is operated when relay 123 is energized and which drives the recorder when the vehicle or tractor is moving in either direction, being provided for this purpose with any suitable reversing gear or other similar device as shown at 127. It is to be understood that either the one-way drive or the reversing drive may be used with either or both of the distance indicator and the distance recorder. The time indicator and recorder and the distance indicator and recorder may be of any suitable construction such, for example, as those now being manufactured and placed upon the market. Furthermore, it is to be expressly understood that, except as otherwise designated, the term "registering mechanism" is to be construed as generic to any suitable indicating or recording device or system, such as a time indicator, time recorder, distance indicator, or distance recorder, or any combination of one or more of these, as well as to registering mechanisms for indicating or recording the combined functions, e. g. speed indicators or recorders. It will also be apparent that, in place of the separate relays as illustrated, it is within the purview of the invention to provide single relays with one or more windings as may be required.

While the illustrated embodiments of the invention have been described with considerable particularity, it is to be expressly understood that the invention is not to be restricted thereto, as the same is capable of receiving a variety of mechanical expressions, some of which will readily suggest themselves to those skilled in the art. Furthermore, certain features thereof are capable of use without other features thereof. Thus, the invention is not limited to the use of all of the registering devices or systems 26—32 shown in Fig. 1, for the use of any one or any combination of such registering devices or systems is within the purview of the present invention. Similarly, the invention is not limited to the use of all four of the time indicator, time recorder, distance indicator, and distance recorder in any one registering device or system, as it is within the purview of the present invention to use any one or any combination of these devices. In fact, in the practical application of the invention, probably less than the total number of registering devices or systems would be employed, and not all of the indicating or recording devices would be used in any one registering device or system.

Also, in place of a relay-actuated electrical system including registering devices as illustrated in Fig. 7, the registering device or devices may comprise a detent or brake directly operated by a relay or relays in the main circuit energized by the movement of the vehicle, as illustrated in Fig. 5. Furthermore, in place of having the circuit through the indicating and recording devices closed when relay 111 in the main electrical circuit is energized, the circuit through the indicating and recording devices may be closed when relay 111 is deenergized as illustrated in dotted lines in Fig. 7, wherein contacts 128 are designed to be bridged by circuit-closing element 114 when relay 111 is deënergized. In the latter event, the indication or recordation obtained by the indicators or recorders respectively would be the complement of that obtained when the registering circuit is closed by the energization of the relay 111. Thus, considering the main system diagrammatically illustrated in Fig. 1 as so arranged, registering device or system 26 would register the period when the vehicle or tractor is standing still instead of running, registering device or system 27 would register when the power is off, including the time when the car is standing still, instead of when the power is on, registering device or system 28 would register when the power is on, etc.

Therefore reference is to be had to the claims hereto appended for a definition of the limits of the invention.

What is claimed is:—

1. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, switches in said circuit respectively operated by elements in said power-controlling and said brake-controlling systems, and a generator for supplying said circuit with current driven by the movement of said vehicle or tractor.

2. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a generator for supplying said circuit with current driven by the movement of said vehicle or tractor, and means to operate said circuit to actuate said registering mechanism when the power is off and the brake is off.

3. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a generator for supplying said circuit with current driven by the movement of said vehicle or tractor, and means to operate said circuit to actuate said registering mechanism when the brake is applied.

4. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a generator for supplying said circuit with current driven by the movement of said vehicle or tractor, and means to operate said circuit to actuate said registering mechanism both when the power is on and the brake is applied.

5. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a generator for supplying said circuit with current driven by the movement of said vehicle or tractor, and means to operate said circuit to actuate said registering mechanism when the power is on.

6. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a generator for supplying said circuit with current driven by the movement of said vehicle or tractor, and means to operate said circuit to actuate said registering mechanism when the power is off and the brake is applied.

7. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a generator for supplying said circuit with current driven by the movement of said vehicle or tractor, and means to operate said circuit to actuate said registering mechanism when the power is on and the brake is off.

8. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a generator for supplying said circuit with current driven by the movement of said vehicle or tractor, and means to operate said circuit to actuate said registering mechanism when the power is off.

9. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a generator for supplying said circuit with current driven by the movement of said vehicle or tractor, and means to operate said circuit to actuate said registering mechanism when the brake is off.

10. In apparatus for registering the characteristics of a run of a vehicle or tractor, in combination with the motor thereof and its power-controlling and brake-controlling systems, a current generator driven by the movement of said vehicle or tractor, an electrical circuit supplied with current by said generator, switches in said circuit respectively operated by elements in said power-controlling and said brake-controlling systems, and mechanism in said circuit for registering when the power is off and the brake is off.

11. In apparatus for registering the characteristics of a run of a vehicle or tractor, in combination with the motor thereof and its power-controlling and brake-controlling systems, a current generator driven by the movement of said vehicle or tractor, an electrical circuit supplied with current by said generator, a switch in said circuit operated by an element in said power-controlling system, and mechanism in said circuit for registering when the power is on.

12. In apparatus for registering the characteristics of a run of a vehicle or tractor, in combination with the motor thereof and its power-controlling and brake-controlling systems, a current generator driven by the movement of said vehicle or tractor, an electrical circuit supplied with current by said generator, a switch in said circuit operated by an element in said power-controlling system, and mechanism in said circuit for registering when the power is off.

13. In apparatus for registering the characteristics of a run of a vehicle or tractor, in combination with the motor thereof and its power-controlling and brake controlling systems, a current generator driven by the movement of said vehicle or tractor, an electrical circuit supplied with current by said generator, a switch in said circuit operated by an element in said brake-controlling system, and mechanism in said circuit for registering when the brake is applied.

14. In apparatus for registering the characteristics of a run of a vehicle or tractor, in combination with the motor thereof and its power-controlling and brake-controlling systems, a current generator driven by the movement of said vehicle or tractor, an electrical circuit supplied with current by said generator, a switch in said circuit operated by an element in said brake-controlling system, and mechanism in said circuit for registering when the brake is off.

15. In apparatus for registering the characteristics of a run of a vehicle or tractor, in combination with the motor thereof and its power-controlling and brake-controlling systems, a current generator driven by the movement of said vehicle or tractor, an electrical circuit supplied with current by said generator, switches in said circuit respectively operated by elements in said power-controlling and said brake-controlling systems, and mechanism in said circuit for registering when the power is on and the brake is off.

16. In apparatus for registering the characteristics of a run of a vehicle or tractor, in combination with the motor thereof and its power-controlling and brake-controlling systems, a current generator driven by the movement of said vehicle or tractor, an electrical circuit supplied with current by said generator, switches in said circuit respectively operated by elements in said power-controlling and said brake-controlling systems, and mechanism in said circuit for registering both when the power is on and the brake is applied.

17. In apparatus for registering the characteristics of a run of a vehicle or tractor, in combination with the motor thereof and its power-controlling and brake-controlling systems, a current generator driven by the movement of said vehicle or tractor, an electrical circuit supplied with current by said generator, switches in said circuit respectively operated by elements in said power-controlling and said brake-controlling systems, and mechanism in said circuit for registering when the power is off and the brake is applied.

18. In apparatus for registering the characteristics of a run of a vehicle or tractor, in combination with the motor thereof and its power-controlling and brake-controlling systems, a current generator driven by the movement of said vehicle or tractor, an electrical circuit supplied with current by said generator, switches in said circuit respectively operated by elements in said power-controlling and said brake-controlling systems, and mechanism in said circuit for registering when the vehicle or tractor is in motion.

19. In apparatus for registering the characteristics of a run of a vehicle or tractor, in combination with the motor thereof and its power-controlling and brake-controlling systems, a current generator driven by the movement of said vehicle or tractor, an electrical circuit supplied with current by said generator, switches in said circuit respectively operated by elements in said power-controlling and said brake-controlling systems, and mechanism in said circuit for registering when the vehicle or tractor is in motion and when the power is off and the brake is off.

20. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a switch in said circuit, an electromagnet adapted to be energized when the power is on for operating said switch, and means operated by an element in said brake-controlling system for maintaining said switch open.

21. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a switch in said circuit, an electromagnet adapted to be energized when the power is on and having its armature operatively connected to said switch, and an element in said brake-controlling system adapted to interlock with said armature when the brake is applied.

22. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a switch in said circuit, an electromagnet adapted to be energized when the power is on and having its armature operatively connected to said switch, and an element in said brake-controlling system adapted to move said armature to operate said switch.

23. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, a switch in said circuit, an electromagnet in one of said systems having its armature connected to said switch to operate the same, and an element in the other of said systems adapted to move said armature to operate said switch.

24. In combination, an electrical circuit in a controlling system, an electromagnet in said circuit, a switch connected to the armature of said electromagnet, an element in an independent controlling system adapted to move said armature in one direction, and means on said armature to move said element in one direction.

25. In combination, an electrical circuit in a controlling system, an electromagnet in said circuit, a switch connected to the armature of said electromagnet and adapted to be operated when said electromagnet is energized, and an element in an independent controlling system adapted to move said armature to operate said switch, said armature coacting with said element to displace the same to inoperative position when the electromagnet is energized.

26. In apparatus for registering the characteristics of a run of a vehicle or tractor, in combination with the motor thereof and its power-controlling and brake-controlling systems, an electrical circuit, switches in said circuit respectively operated by elements in said power-controlling and brake-controlling systems, means driven by the movement of said vehicle or tractor for positively effecting the energization of said circuit, and mechanism in said circuit for registering when the power is off and the brake is off.

27. In apparatus for registering the characteristics of a run of a vehicle or tractor, in combination with the motor thereof and its power-controlling and brake controlling systems, an electrical circuit, switches in said circuit respectively operated by elements in said power-controlling and said brake-controlling systems, means driven by the movement of said vehicle or tractor whereby said circuit is supplied with current only while said vehicle or tractor is in motion, and mechanism in said circuit for registering when the power is on.

28. In apparatus for registering the characteristics of a run of a vehicle or tractor, in combination with the motor thereof and its power-controlling and brake-controlling systems, an electrical circuit, switches in said circuit respectively operated by elements in said power-controlling and said brake-controlling systems, means driven by the movement of said vehicle or tractor whereby said circuit is supplied with current only while said vehicle or tractor is in motion, and mechanism in said circuit for registering when the power is off.

29. In apparatus for registering the characteristics of a run of a vehicle or tractor, in combination with the motor thereof and its power-controlling and brake-controlling systems, an electrical circuit, switches in said circuit respectively operated by elements in said power-controlling and said brake-controlling systems, means driven by the movement of said vehicle or tractor whereby said circuit is supplied with current only while said vehicle or tractor is in motion, and mechanism in said circuit for registering when the brake is applied.

30. In apparatus for registering the characteristics of a run of a vehicle or tractor, in combination with the motor thereof and its power-controlling and brake-controlling systems, an electrical circuit, switches in said circuit respectively operated by elements in said power-controlling and said brake-controlling systems, means driven by the movement of said vehicle or tractor whereby said circuit is supplied with current only while said vehicle or tractor is in motion, and mechanism in said circuit for registering when the brake is off.

31. In apparatus for registering the characteristics of a run of a vehicle or tractor, in combination with the motor thereof and its power-controlling and brake-controlling systems, an electrical circuit, switches in said circuit respectively operated by elements in said power-controlling and said brake-controlling systems, means driven by the movement of said vehicle or tractor whereby said circuit is supplied with current only while said vehicle or tractor is in motion, and mechanism in said circuit for registering when the power is on and the brake is off.

32. In apparatus for registering the characteristics of a run of a vehicle or tractor, in combination with the motor thereof and its power-controlling and brake-controlling systems, an electrical circuit, switches in said circuit respectively operated by elements in said power-controlling and said brake-controlling systems, means driven by the movement of said vehicle or tractor whereby said circuit is supplied with current only while said vehicle or tractor is in motion, and mechanism in said circuit for registering both when the power is on and the brake is applied.

33. In apparatus for registering the characteristics of a run of a vehicle or tractor, in combination with the motor thereof and its power-controlling and brake-controlling systems, an electrical circuit, switches in said circuit respectively operated by elements in said power-controlling and said brake-controlling systems, means driven by the movement of said vehicle or tractor whereby said circuit is supplied with current only while said vehicle or tractor is in motion, and mechanism in said circuit for registering when the power is off and the brake is applied.

34. In apparatus for registering the characteristics of a run of a vehicle or tractor, in combination with the motor thereof and its power-controlling and brake-controlling systems, an electrical circuit, switches in said circuit respectively operated by elements in said power-controlling and said brake-controlling systems, means driven by the movement of said vehicle or tractor whereby said circuit is supplied with current only while said vehicle or tractor is in motion, and mechanism in said circuit for registering when the vehicle or tractor is in motion.

35. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, switches in said circuit respectively operated by elements in said power-controlling and said brake-controlling systems, and means driven by the movement of said vehicle or tractor for positively effecting the energization of said circuit.

36. In apparatus for registering the characteristics of a run of a vehicle or tractor, in combination with the motor thereof and its power-controlling and brake-controlling systems, registering mechanism, electrical means for controlling the operation of said registering mechanism, a circuit including said controlling means, switches in said circuit respectively operated by elements in said power-controlling and said brake-controlling systems, and means driven by the movement of said vehicle or tractor for positively operating a switch in said circuit.

37. In apparatus for registering the characteristics of a run of a vehicle or tractor, in combination with the motor thereof and its power-controlling and brake-controlling systems, registering mechanism, an electrical circuit for actuating said registering mechanism, switches in said circuit respectively operated by elements in said power-controlling and said brake-controlling systems, and means driven by movement of said vehicle or tractor whereby said circuit is supplied with current only while said vehicle or tractor is in motion.

In testimony whereof I have signed this specification.

ALONZO MORRIS BUCK.